Figure 1:
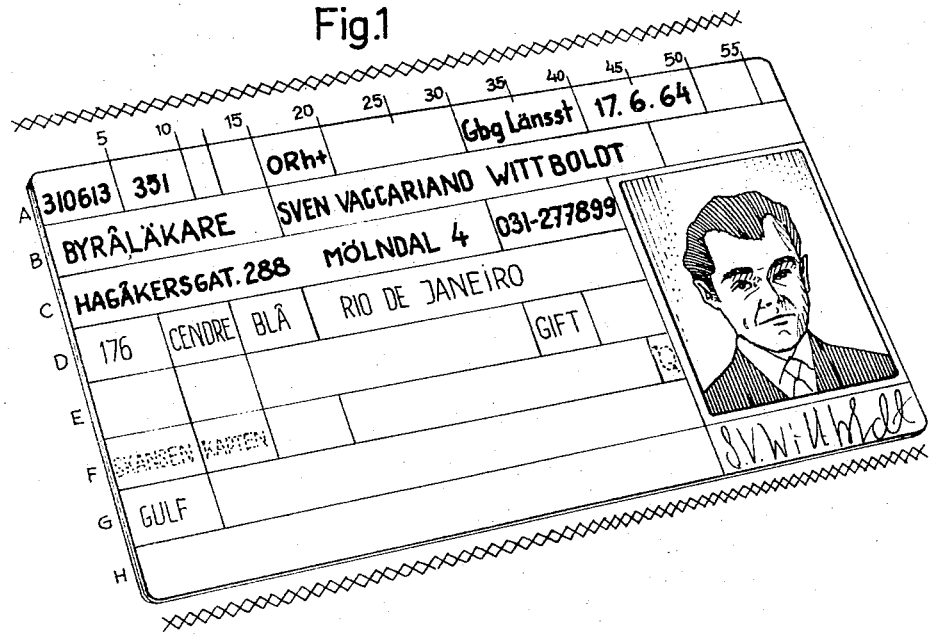

Jan. 16, 1968   S. V. WITTBOLDT   3,363,346
DATA CARD FOR A COMPILING, TRANSPORTING AND COMMUNICATING
SYSTEM, PARTICULARLY INTENDED FOR PERSONAL
CHARACTERIZING DATA
Filed May 24, 1965

United States Patent Office 3,363,346
Patented Jan. 16, 1968

3,363,346
DATA CARD FOR A COMPILING, TRANSPORTING AND COMMUNICATING SYSTEM, PARTICULARLY INTENDED FOR PERSONAL CHARACTERIZING DATA
Sven Vaccariano Wittboldt, Molndal, Sweden, assignor to Hälso-och Sjukvårdsinformation AB, Molndal, Sweden
Filed May 24, 1965, Ser. No. 458,049
Claims priority, application Sweden, June 17, 1964, 73,871/64
1 Claim. (Cl. 40—2.2)

The present invention intends to create conditions for a system for compiling, transporting and communicating of particular personnel characterizing data by entering on one medium—a data card—all necessary data in conneciton with a person's activity under different circumstances in a community and which can be given over by the person in question to the authorities or other bodies which may have need of such information in a rational manner.

Various types of personnel, national health and credit cards are known, which cards are known, which cards are used in various contexts by various members of the community. None of these known cards, however, are so constructed that they are capable of being used by various authorities as well as privately for everything which concerns a certain person.

The present invention intends, as was mentioned, to create such a possibility and comprises mainly a data card intended as a personnel card, which data card is characterized in that it consists of an embossible material for example plastic, suitable transparent plastic, and which has a length approximately corresponding to a multiple of the down strokes (for example 1–56) of a writing or embossing machine, and a height which approximately corresponds to a multiple of the number of lines on a writing or embossing machine (A–H) and that it is divided up into data fields, the extension of which is defined firstly by the number of lines of the embossing or writing machine, each such field includes in a vertical direction, for example 1, secondly the number of down strokes of the embossing or writing machine which it includes in a horizontal direction (e.g., 10), whereby each field, corresponding to a certain type of information, is alotted its stationary position on the card and this position is so chosen that areas having reproducible information mediatory embossible fields, similarly areas of non reproducible information mediatory, solely visually, optically by means of X-ray, electrically or magnetically readable stamping field is obtained, in such a way, that the data on one or more embossing field with the assistance of embossing members—the coordinates of which in relation ot stops, on an embossing anvil or the like, intended to cooperate with two of the edges of the card bordering adjacent to each other correspond to the coordinates of the field in question on the card—can be selectively reproduced.

Such an embossible personnel card is indeed useful as an identity card, credit card, national health document, address card, passport, driving license, pilot and skippers license, etc. embossing plate, support for X-ray embossing, diabetic and epileptic cards, collection cards for various medicinal data, for example blood groups, vaccinations, serum injections, health cards for children, pass-card, employers cards, temporary passports for seamen etc.

Planning of such a data card is made so that the separate sources of informations. such as parish offices, national registration offices, national health offices, military offices, national health and insurance authorities and various hospitals, insurance companies, employers, seamen's hostels, passport authorities, borough councils, etc., are layed out on the card and allotted their own particular field. This field is then filled in by pertinent authorities, for example the borough council concerned or national service authorities in accordance with information obtained from the above mentioned source. It would be convenient also to arrange embossing centres for personnel or data cards according to the present invention in connection with existing punch card centres in the borough councils or national conscription bureaus.

According to one embodiment of the invention one field of the card is constituted by a card identifying or a card check code field intended for checking that the card has been issued by entitled authorities and is authorised. The code disposed in the code-filed thus constitutes at the same time the signature of the issuing authority.

It is also an advantage not to emboss one information-field, in the following called the stamping field (for example C–H40–56) which can then form a photo field for receiving a photograph and/or thumb print—and also possibly a signature—set into the material of the card.

So as to make the embossed text easier to read, the material from which the card is made can be suitably mixed with a dye, causing the embossed types in the embossing field to show up against the coloured basic material. If it is wished to transfer the embossed information onto X-ray plates, it is advantageous to inset coloured—possibly magnetisable and X-ray impermeable—mass into the embossed types, whereupon for example a patient's data could be transferred on to an X-ray plate. Alternatively it is conceivable to use the card as a matrix and by means of the same emboss a patient's data into an X-ray impermeable casing around an X-ray plate, whereby the information embossed in the casing becomes permeable to X-rays.

If it is desired to form such embossed information so that this information is solely accessable by embossing and not by visual reading, the text can be written as mirror writing. For safe keeping of personal notes, vaccinations certificates, etc., the card can be made of double thickness and the sides of the card bonded together so that a carrying pocket for loose documents is obtained. If the third side is also bonded together a double folded card is obtained which is safe against unauthorised embossing. It is also to advantage to arrange a pair of small pockets, at the back of the card or large pocket, and possibly to form the folded portion of the card-sheet in white plastic in order to more clearly enhance the embossed writing on the card.

The personnel characterizing data is transported so that the person in question carries the card with the entered personal information on his person and presents the card when necessary, or possibly sends the card—or a copy of the text—to those who have requested this information.

Figure 2:
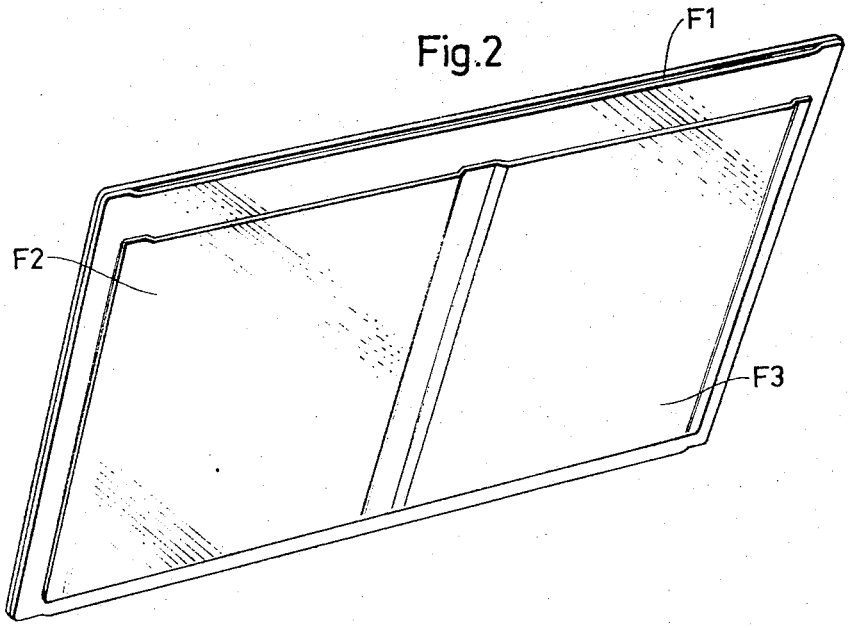

Principally extracting of information from the card is effected in two different ways, namely with or without reproduction and will be more evident from the subsequent description. The description will now be more closely described in connection with the attached drawing on which:

FIG. 1 shows an embodiment of the card according to the invention seen obliquely from the front; and FIG. 2 shows a similar card seen obliquely from the rear.

As can be seen from FIG. 1, the card according to the shown embodiment is divided up into a number of data fields, the extension of which is defined firstly by the number of typewriter lines each field embraces vertically, secondly the number of typewriter down-strokes it embraces horizontally. The typewriter lines are, in the shown example, indicated at the side of the card by the letters A–H and—for example—the photograph occupying the information or stamping field takes up the thus vertically seen columns C–G, whilst its horizontal extension passes from the typewriter down-stroke 40 to down-stroke 56. The whole length of the card thus corresponds—in the shown embodiment—to approximately 56 down-strokes. On the shown card, the profession of the holder and the name, i.e., is inserted in the field defined by the column designation B and the down-strokes 1–45. Thus the name field can be written as B16–45, whereas the profession indicating field bearing the title "byrålåkare" is written as B1–15.

As can be seen from FIG. 1 the card includes firstly fields having embossed writing, marked with heavy writing on the card (Columns A, B, C) which field has been designated EMBOSSING FIELD and secondly information fields which have been designated STAMPING FIELDS—in the shown example the lines D, E and G—in which the writing can be read visually but is not capable of being embossed and which in the figure has been noted down in finer writing and thirdly final information, which is not intended for visual reading but which can be read using special means, for example X-ray recording. This has been indicated in FIG. 1 by dotted writing and the field is found in line F.

As might be evident from this short description, the information fields are thus grouped into embossing fields which permit embossing to be carried out with the aid of an embossing or stamping die designed to correspond to said field, or through the medium of some other aids, and into stamping fields intended firstly for visual reading and secondly writing which is concealed for such immediate reading. A very suitable method of effecting this discrimination is to allow the first mentioned information to appear normally and remaining information to read as mirror writing so that only when it is printed does it read as normal writing. A lay-out will be given in the following of the example in FIG. 1 showing the various fields.

THE EMBOSSING FIELD

| | | |
|---|---|---|
| A13–15—Nationality. | A1–10—Citizen Numbers. | A16–20—Blood group. |
| A21–30—Expires. | A31–40—Issuing Authorities. | A41–50—Date. |
| A51–56—Reserved. | A11–12—Check control code. | |
| B1–15—Profession. | B16–45—Name. | B46–56—Parish number. |
| C1–30—Address. | C31–40—Telephone number. | |

THE STAMPING FIELD
[Readable]

| | | |
|---|---|---|
| D1–5—Height. | D6–10—Colour of Hair. | D11–15—Colour of Eyes. |
| D16–40—Place of Birth. | | |
| E1–5—National Health Office. | E6–10—National Health Class. | E11–30—National Health District. |
| E31–35—Married, Single, Divorced. | E36–40—Reserved. | |
| G1–5—Crediting firm. | G6–40—Reserved. | |
| H1–40—Reserved. | H40–56—Signature. | |

THE STAMPING FIELD
[Cannot be read visually]

| | | |
|---|---|---|
| F1–5—Place of Work. | F6–10—Office Held. | F11–39—Next of Kin. |
| F40—Reserve Numbers (forces). | | |

Naturally the embossing and stamping fields can also be divided up in another way.

The stamping field thus lacks reproducible writing or other material. In the example, the field B–H40–56 is taken up by the photograph. Such fields are arranged, as has already been mentioned, for the following pieces of information: Driving license, pilots and master mariners certificates, fields for fingerprints, passport, permits, blood donor, diabetic, epileptic, A.P. treatment, company stamp for credit cards.

REMAINING FIELDS

The back of the card is divided up into, as can be seen from FIGURE 2, firstly a pocket F1 for the owners personal documents, vaccination certificate etc. and outside the rear of said pocket two more pockets F2 and F3 for various certificates and memory-notes.

Thus the construction of the card is either so that it is made doubly folded and thereby bonded together on three sides, or single thickness so that a pocket is formed in the same. The card is embossed before it is folded and bonded together. The rear of the card, as has already been mentioned, is supplied with small pockets for memory-notes. Statements on the card for data fields are made in a coordinate system where the horizontal axis is constituted by Arabic numerals (1–56) and the vertical axis by capital letters (A–H). The number of horizontal positions equals the number of down strokes on the embossing or typing machine. The number of vertical positions equals the number of lines on the embossing or typing machine.

In the aforegoing has been described the construction of the card, the lay-out of its information and the extraction of such information, whereby it is also maintained that the extraction, principally carried out in two different ways—with or without reproduction—is made possible by executing the different types of information with different printing modes and that reproduction is thereby made possible by the fact that the card has an embossible field and consequently can be used as a matrix for printing.

Due to the standardised positioning of the various pieces of information an advantage is also gained in that the personnel card can constitute a matrix for storing various data registers where this data constitutes a sorting element.

It has also been mentioned above that embossing of the card can be entrusted to various authorised authorities such as the borough council or national service authorities, whereby it would be suitable to install the embossing centre in connection with centres for embossing punch cards that are already in existence at such government offices.

The method of producing the embossible personnel data card would be to first produce a punch card corresponding to the document which is to be the basis for said embossing and thereafter to allow the punch card to control the embossing operations by means of a data machine.

The punch card, subsequent to being passed as correct, could be retained as an original document instead of the actual original document. It would be convenient to have one punch card for each line of information or embossing fields on the card so that punch cards can be changed more easily when information in associated fields corresponding to that punch card is altered.

It would thus be possible to use card A–H for embossing data pertinent to a healthy person and—for example—card K–M for diabetics with more special information required for printing for such disabled persons.

Although the invention has been described in connection with one embodiment of the same it can, however, be varied arbitrarily within the scope of the following claim.

I claim:
1. A data card for compiling, transporting and communicating data comprising a first substantially rectangular sheet of paper and two larger sheets of plastic material disposed on opposite sides of said paper and sealed together about the edges thereof, said card being divided up into a plurality of data fields identifiable by X-Y coordinates, said plastic material being of the type suitable for embossing whereby one of said data fields may be provided with embossed data capable of being reproduced, said plastic material having dye means impregnated therein so that said embossed data is disposed in light-dark contrast with the remainder of said card, said plastic being normally X-ray opaque and capable of being selectively modified in another one of said data fields whereby information contained in said data field may be reproduced by means of X-rays.

References Cited

UNITED STATES PATENTS

| | | | |
|---|---|---|---|
| 1,128,100 | 2/1915 | Buchanan | 283—34 |
| 1,192,829 | 7/1916 | Harriman | 283—34 |
| 2,835,993 | 5/1958 | Whitehead | 40—2.2 |
| 2,898,257 | 8/1959 | Carver | 40—2.2 |
| 2,903,276 | 9/1959 | Bates | 101—369 |
| 3,015,267 | 1/1962 | Dashew | 101—369 |
| 3,106,706 | 10/1963 | Kolanowski | 283—8 |
| 3,245,697 | 4/1966 | Nugent | 283—7 |

EUGENE R. CAPOZIO, *Primary Examiner.*

W. J. CONTRERAS, *Assistant Examiner.*